(12) United States Patent
Yoon et al.

(10) Patent No.: US 10,791,492 B2
(45) Date of Patent: Sep. 29, 2020

(54) METHOD AND APPARATUS FOR MONITORING INTERNET CONNECTION STATUS IN WIRELESS COMMUNICATION SYSTEM

(71) Applicant: Samsung Electronics Co., Ltd., Suwon-si, Gyeonggi-do (KR)

(72) Inventors: Kang-Jin Yoon, Seoul (KR); Jiangwei Xu, Suwon-si (KR); Hyeon-Jin Kang, Seoul (KR); Kill-Yeon Kim, Suwon-si (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/195,039

(22) Filed: Nov. 19, 2018

(65) Prior Publication Data

US 2019/0090171 A1    Mar. 21, 2019

Related U.S. Application Data

(63) Continuation of application No. 14/193,179, filed on Feb. 28, 2014, now Pat. No. 10,136,376.

(30) Foreign Application Priority Data

Feb. 28, 2013 (KR) .................. 10-2013-0022291

(51) Int. Cl.
*H04W 36/26* (2009.01)
*H04L 12/26* (2006.01)
*H04W 36/14* (2009.01)

(52) U.S. Cl.
CPC ......... *H04W 36/26* (2013.01); *H04L 43/0811* (2013.01); *H04L 43/10* (2013.01); *H04W 36/14* (2013.01)

(58) Field of Classification Search
CPC .......... H04L 43/08; H04L 43/16; H04B 1/52; H04B 1/006
USPC ...................................................... 709/224
See application file for complete search history.

(56) References Cited

U.S. PATENT DOCUMENTS

| 6,347,091 | B1 * | 2/2002 | Wallentin | H04W 28/18 |
| | | | | 370/235 |
| 6,434,391 | B1 * | 8/2002 | Rutan | H04W 84/025 |
| | | | | 340/7.21 |
| 6,594,238 | B1 * | 7/2003 | Wallentin | H04W 28/18 |
| | | | | 370/252 |

(Continued)

FOREIGN PATENT DOCUMENTS

| EP | 1 744 498 A1 | 1/2007 |
| EP | 1 088 463 B1 | 4/2010 |

(Continued)

*Primary Examiner* — Mahran Y Abu Roumi
(74) *Attorney, Agent, or Firm* — Jefferson IP Law, LLP

(57) ABSTRACT

A method and mobile station in a wireless communication system is provided. The method includes determining whether there is a packet that is at least one of transmitted and received for each of time intervals, determining a traffic status of at least one of transmission and reception based on a result of the determining of whether there is the packet that is the at least one of transmitted and received for each of the time intervals, and determining the internet connection status based on the determined traffic status of the at least on transmission and reception.

17 Claims, 8 Drawing Sheets

(56) References Cited

U.S. PATENT DOCUMENTS

| | | | | |
|---|---|---|---|---|
| 7,126,924 B2* | 10/2006 | Suzuki | H04W 76/38 | 370/311 |
| 7,990,887 B2* | 8/2011 | Cidon | H04L 43/50 | 370/238 |
| 7,991,399 B2* | 8/2011 | Ganesan | H04M 1/2535 | 455/436 |
| 8,086,732 B1* | 12/2011 | Volz | H04L 61/2015 | 709/200 |
| 8,155,081 B1* | 4/2012 | Mater | H04W 4/04 | 370/254 |
| 8,204,990 B1* | 6/2012 | Avery | H04L 12/4625 | 307/112 |
| 8,385,316 B2* | 2/2013 | Laroia | H04W 56/002 | 370/350 |
| 8,417,828 B2* | 4/2013 | Ma | H04L 65/608 | 709/231 |
| 8,644,152 B2* | 2/2014 | Krueger | H04L 12/2856 | 370/230.1 |
| 9,060,320 B1* | 6/2015 | Cairns | H04W 48/00 | |
| 2001/0028640 A1* | 10/2001 | Taketsugu | H04W 92/02 | 370/349 |
| 2002/0133597 A1* | 9/2002 | Jhingan | H04L 67/30 | 709/228 |
| 2004/0127226 A1* | 7/2004 | Dugad | H04W 72/10 | 455/450 |
| 2004/0190449 A1* | 9/2004 | Mannal | H04L 47/10 | 370/229 |
| 2005/0097199 A1* | 5/2005 | Woodard | H04L 67/125 | 709/223 |
| 2005/0105482 A1* | 5/2005 | Kobayashi | H04L 1/0002 | 370/310.1 |
| 2005/0147049 A1* | 7/2005 | Ganesan | H04M 1/2535 | 370/241 |
| 2005/0251684 A1* | 11/2005 | Mitsuoka | H04L 67/1097 | 713/182 |
| 2006/0205396 A1* | 9/2006 | Laroia | H04L 1/0015 | 455/422.1 |
| 2007/0019992 A1 | 1/2007 | Abe | | |
| 2007/0064903 A1* | 3/2007 | Xiang | H04L 12/66 | 379/202.01 |
| 2007/0159992 A1* | 7/2007 | Kim | H04W 52/0216 | 370/311 |
| 2007/0176789 A1* | 8/2007 | Kim | H04L 67/12 | 340/870.02 |
| 2007/0249291 A1* | 10/2007 | Nanda | H04W 36/0083 | 455/73 |
| 2007/0275701 A1* | 11/2007 | Jonker | H04W 48/16 | 455/414.1 |
| 2008/0080465 A1* | 4/2008 | Pajukoski | H04L 1/0016 | 370/342 |
| 2008/0137541 A1* | 6/2008 | Agarwal | H04W 4/02 | 370/241 |
| 2009/0094361 A1* | 4/2009 | Srinivasan | H04L 65/1073 | 709/224 |
| 2009/0124212 A1* | 5/2009 | Islam | H04W 72/02 | 455/70 |
| 2009/0252124 A1* | 10/2009 | Yeo | H04W 72/1252 | 370/336 |
| 2010/0061272 A1* | 3/2010 | Veillette | H04L 45/34 | 370/254 |
| 2010/0110921 A1* | 5/2010 | Famolari | H04W 48/17 | 370/252 |
| 2010/0222063 A1* | 9/2010 | Ishikura | H04B 7/024 | 455/450 |
| 2010/0290337 A1* | 11/2010 | Suvi | H04W 12/08 | 370/217 |
| 2011/0066415 A1* | 3/2011 | Thompson | H04Q 3/0083 | 703/13 |
| 2011/0085447 A1* | 4/2011 | Kholaif | H04W 12/04 | 370/242 |
| 2011/0110299 A1* | 5/2011 | Ghibaudo | H04L 12/5692 | 370/328 |
| 2011/0116417 A1* | 5/2011 | Chang | H04L 67/1095 | 370/255 |
| 2011/0116451 A1* | 5/2011 | Xu | H04W 72/1257 | 370/328 |
| 2012/0003976 A1 | 1/2012 | Bhat et al. | | |
| 2012/0008591 A1* | 1/2012 | Miki | H04J 13/16 | 370/330 |
| 2012/0057578 A1* | 3/2012 | Park | H04W 76/10 | 370/338 |
| 2012/0120836 A1* | 5/2012 | Lewis | H04W 48/12 | 370/252 |
| 2012/0140651 A1* | 6/2012 | Nicoara | H04W 48/18 | 370/252 |
| 2013/0058268 A1* | 3/2013 | Kholaif | H04W 74/085 | 370/311 |
| 2013/0107929 A1* | 5/2013 | Ma | H04W 72/08 | 375/225 |
| 2013/0128947 A1* | 5/2013 | Fryer | H04N 21/2402 | 375/240.01 |
| 2014/0179238 A1* | 6/2014 | Wynn | H04L 41/5067 | 455/67.11 |
| 2014/0329516 A1* | 11/2014 | Falconetti | H04W 28/0215 | 455/418 |

FOREIGN PATENT DOCUMENTS

| | | |
|---|---|---|
| KR | 10-2008-0098874 A | 11/2008 |
| WO | 03/017601 A1 | 2/2003 |

* cited by examiner

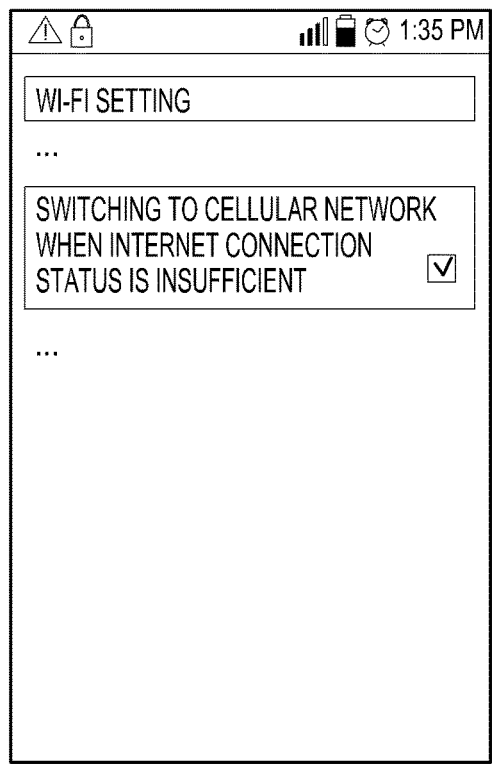 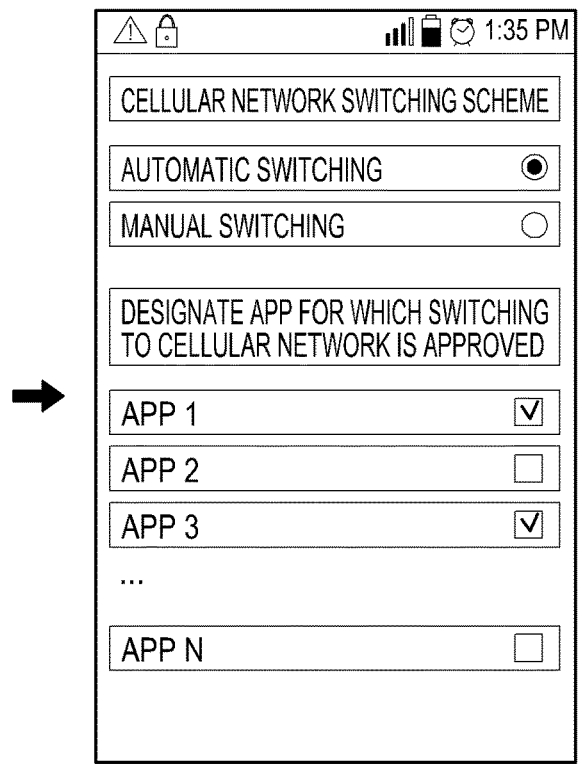
FIG.9A    FIG.9B
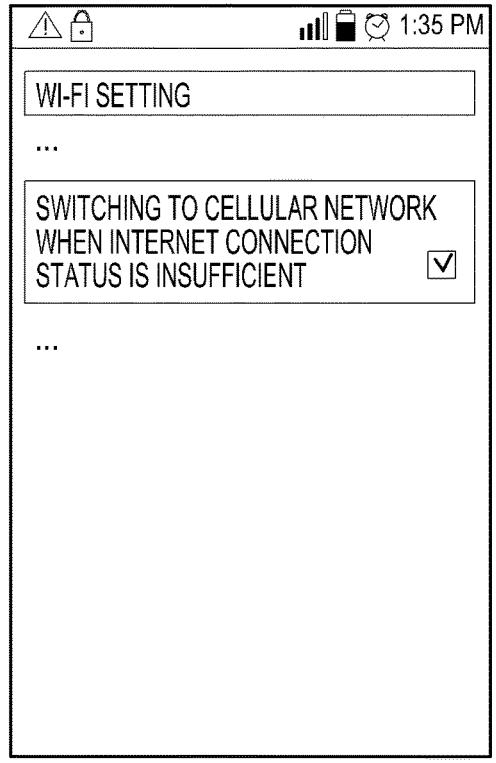 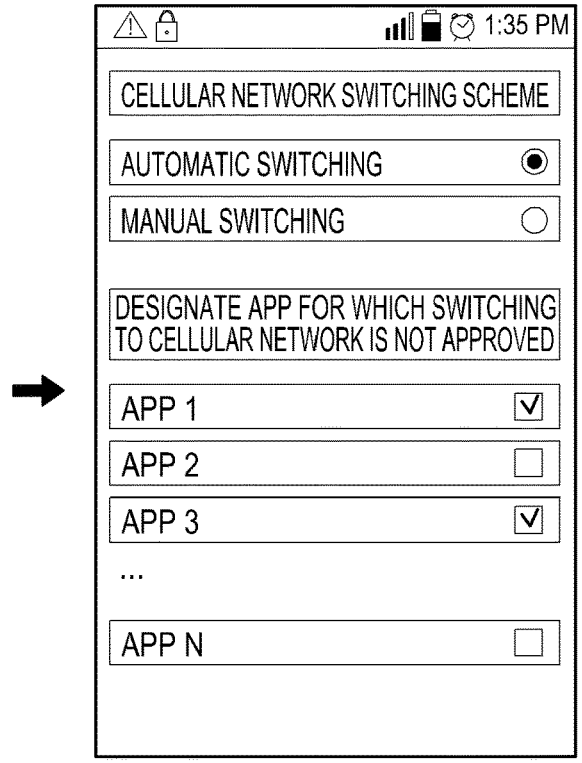
FIG.10A    FIG.10B

METHOD AND APPARATUS FOR MONITORING INTERNET CONNECTION STATUS IN WIRELESS COMMUNICATION SYSTEM

CROSS-REFERENCE TO RELATED APPLICATION(S)

This application is continuation of prior application Ser. No. 14/193,179, filed Feb. 28, 2014, which was based on and claimed priority under 35 U.S.C. § 119(a) of a Korean patent application number filed on Feb. 28, 2013 in the Korean Intellectual Property Office and assigned Serial number 10-2013-0022291, the entire disclosure of which is hereby incorporated by reference.

TECHNICAL FIELD

The present disclosure relates to a method and an apparatus for monitoring an internet connection status in a wireless communication system.

BACKGROUND

In the conventional wireless communication system, an internet connection status is determined using a Domain Name System (DNS) ping or Address Resolution Protocol (ARP) ping only in an initial stage of access to an Access Point (AP) by a mobile station. Thus, it is impossible in the conventional wireless communication system to determine whether there is a problem in the internet connection while a user has an initiated connection to the internet. Further, even if there is a problem in the internet connection, the mobile station does not switch to another AP or cellular network if reception signal strength of the corresponding AP is sufficiently high enough. Thus, a user may perceive a reduction in performance for the internet connection while the signal strength remains high.

Currently, switching between a Wi-Fi network and the cellular network is performed according to an internet connection status of an AP based on an application program or specific Application Programming Interface (API) provided only to a specific mobile station user. However, such a method may be used only for the specific mobile station user and thus, has a limit in general purpose use.

Accordingly, a method and an apparatus for monitoring an internet connection status in a wireless communication system are desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for monitoring an internet connection status in a wireless communication system.

Another aspect of the present disclosure is to provide a method and an apparatus for preventing a disconnection of the Internet by determining an internet connection status in an initial stage of Access Point (AP) access and during an internet service using the corresponding AP.

Another aspect of the present disclosure is to provide a method and an apparatus which may improve a perceived performance of users using the internet service.

In accordance with an aspect of the present disclosure, a method of monitoring an internet connection status by a mobile station in a wireless communication system is provided. The method includes determining whether there is a packet that is at least one of transmitted and received for each of time intervals, determining a traffic status of at least one of transmission and reception based on a result of the determining of whether there is the packet that is the at least one of transmitted and received for each of the time intervals, and determining the internet connection status based on the determined traffic status of the at least one of transmission and reception.

In accordance with another aspect of the present disclosure, a mobile station in a wireless communication system is provided. The mobile station includes a wireless unit configured to at least one of transmit and receive a packet, and a controller configured to determine whether there is a packet that is at least one of transmitted and received for each of time intervals, determines a traffic status of at least one of transmission and reception based on a result of the determining of whether there is the packet that is the at least one of transmitted and received for each of the time intervals, and determines the internet connection status based on the determined traffic status of the at least one of transmission and reception.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A and 9B illustrate user interfaces through which switching to a cellular network may be selectively used for each of application programs according to an embodiment of the present disclosure; and FIGS. 10A and 10B illustrate other user interfaces through which switching to a cellular network may be selectively used for each of application programs according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
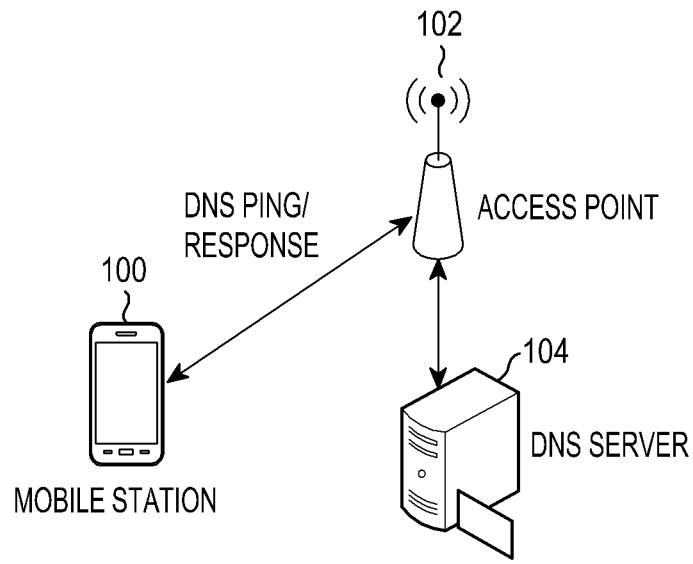
FIG. 1 illustrates a wireless communication system according to an embodiment of the present disclosure.

FIG. 1 illustrates a wireless communication system according to an embodiment of the present disclosure.

Referring to FIG. 1, the wireless communication system includes a mobile station 100, an Access Point (AP) 102, and a Domain Name Server (DNS) server 104.

The mobile station 100 is a multi-mode station capable of using a plurality of wireless communication technologies such as cellular communication, and wireless communication in the unlicensed band. The cellular communication may be 3-Generation (3G) communication or Long Term Evolution (LTE) communication, and the wireless communication in the unlicensed band may be Wireless Fidelity (Wi-Fi) communication. Hereinafter, the Wi-Fi communication will be described as an example of the wireless communication used in the unlicensed band.

The mobile station 100 may use the cellular communication through a base station (not illustrated) of a cell according to a location of the mobile station 100, and may use the Wi-Fi communication through the AP 102. The AP 102 may be one of a plurality of APs contiguous to the mobile station 100, and an AP used by the mobile station 100 may be changed periodically or in real time according to a location of the mobile station 100, reception signal strength, and a network status.

Meanwhile, when the mobile station 100 is provided with an internet service through the AP 102, the mobile station 100 conducts a ping test on the AP 102 such that a user may smoothly use the internet service. The ping test is conducted to monitor an internet connection status, and may be, for example, a DNS ping test or an Address Resolution Protocol (ARP) ping test. It will be exemplified in the embodiment of the present disclosure that among the two ping tests, the DNS ping test is conducted.

The DNS ping test is conducted to check a connection with the DNS server 104, and may be conducted by using an address of the DNS server 104. The mobile station 100 transmits a preset number of ping commands (hereinafter, referred to as 'ping') to the DNS server 104 through the AP 102, and determines whether there is a response from the DNS server 104 within a preset period of time.

When there is a response from the DNS server 104 within the preset period of time, the mobile station 100 determines that the internet connection status through the AP 102 is sufficient, and continuously maintains the access to the AP 102. On the other hand, when there is no response from the DNS server 104 within the preset period of time, the mobile station 100 determines that the internet connection status through the AP 102 is insufficient, and releases the access to the AP 102. The mobile station 100 searches for another AP to access for reception of an internet connection.

Meanwhile, the mobile station 100 may determine the internet connection status according to a traffic transmission/reception pattern in addition to the method of determining the internet connection status by using the ping test. Specific details thereof will be described below in detail.

The AP 102 enables the mobile station 100 to use an internet service based on the Wi-Fi communication. The AP 102 transmits data packets received from the DNS server 104 to the mobile station 100 and data packets received from the mobile station 100 to an internet network through the DNS server 104.

The DNS server 104 is located between an external internet network and the access point 102, and transfers an internet service requested from the mobile station 100 to the mobile station 100 through the access point 102.

Hereinafter, an internal configuration of the mobile station 100 will be described in detail with reference to FIG. 2.

Figure 2:
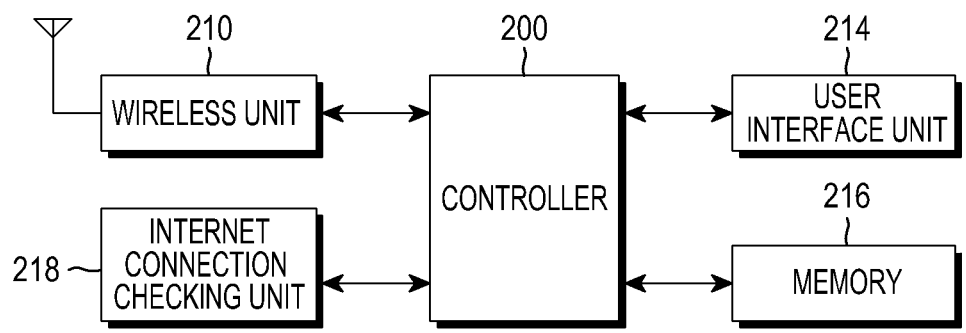
FIG. 2 is a block diagram of a mobile station according to an embodiment of the present disclosure.

FIG. 2 is a block diagram of a mobile station according to an embodiment of the present disclosure.

Referring to FIG. 2, the mobile station 100 includes a controller 200, a wireless unit 210, a user interface unit 214, a memory 216, and an internet connection checking unit 218.

The controller 200 controls an overall operation of the mobile station 100 by controlling the wireless unit 210, the user interface unit 214, the memory 216, and the internet connection checking unit 218.

The wireless unit 210 is an element for wireless communication of the mobile station 100, and may include a communication module performing packet transmission and/or reception based on cellular communication, and a communication module performing packet transmission and/or reception based on Wi-Fi communication.

The user interface unit 214 may include a key input unit for a user's key input, and a display unit that displays various pieces of information to provide to the user. Although the key input unit and the display unit may be included in the user interface unit 214 while being physically differentiated, the key input unit and the display unit may also be included in the form of one physical element such as a touch screen in the user interface unit 214. According to the embodiment of the present disclosure, the user interface unit 214 may provide a menu enabling a user to selectively use the cellular communication and the Wi-Fi communication (e.g., a Wi-Fi interface and a cellular interface), and a menu enabling the user to change network settings.

The memory 216 stores various pieces of information generated according to operations of the mobile station 100. As an example, the memory 216 may store image data or videos generated according to usage of an internet service, and several pieces of information generated according to a process of checking an internet connection status.

The internet connection checking unit 218 performs an internet connection status checking process and a network switching process (e.g., switching from a cellular network to a Wi-Fi network, or switching from the Wi-Fi network to the cellular network). Meanwhile, although the internet connection checking unit 218 has been illustrated as one independent element in FIG. 2, the operation of the internet connection checking unit 218 may be performed by the controller 200, in which case the internet connection checking unit 218 may not be included in the mobile station.

Hereinafter, specific operations of the internet connection checking unit 218 will be described with reference to FIGS. 3 to 7.

Figure 3:
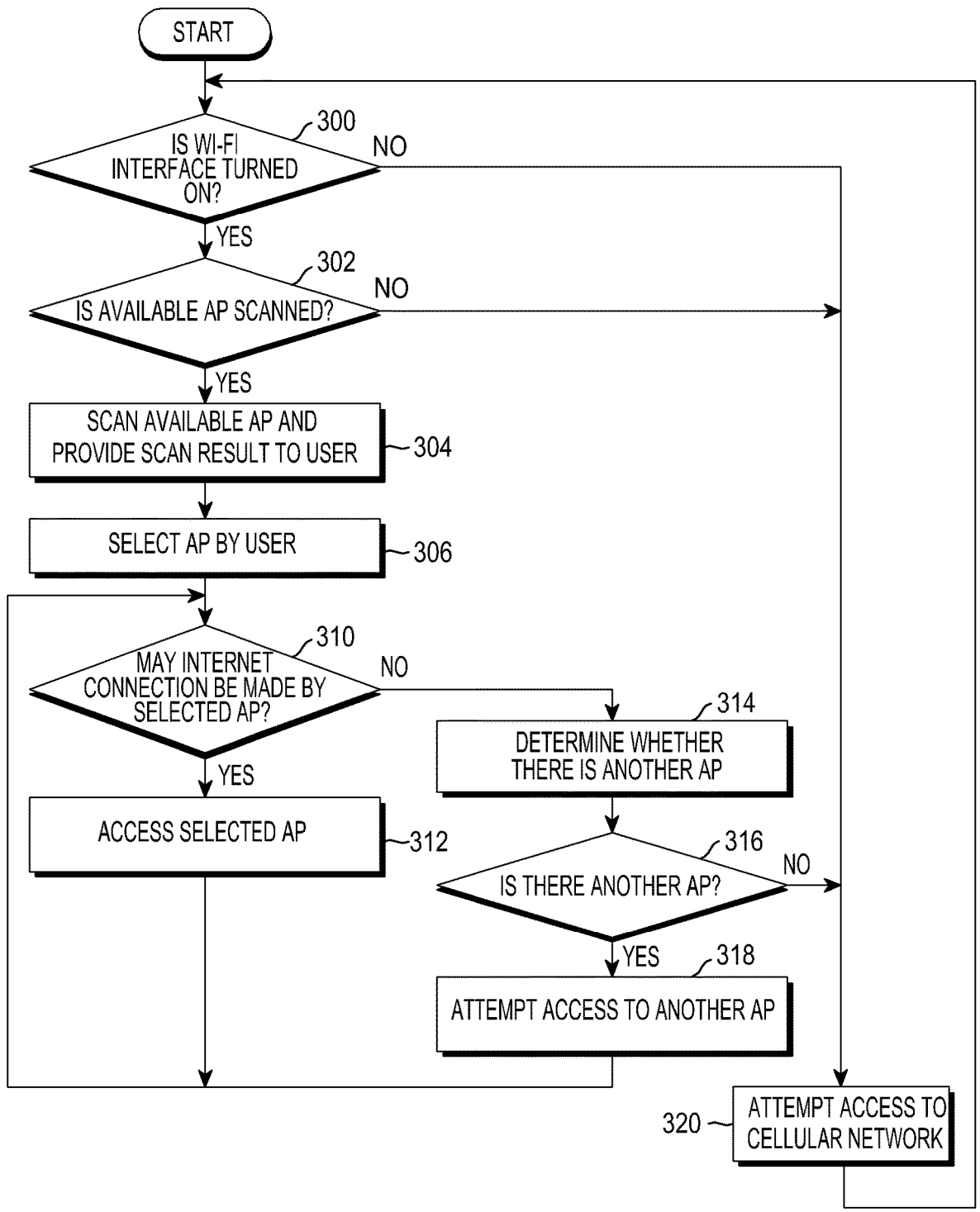
FIG. 3 is a flowchart schematically illustrating operations of an internet connection checking unit according to an embodiment of the present disclosure.

FIG. 3 is a flowchart schematically illustrating operations of an internet connection checking unit according to an embodiment of the present disclosure.

Referring to FIG. 3, the internet connection checking unit 218 may determine in operation 300 whether a Wi-Fi interface is turned on. A turned-on status of the Wi-Fi interface represents a status in which Wi-Fi communication may be made, and a turned-off status of the Wi-Fi interface represents a status in which the Wi-Fi communication cannot be made.

When the Wi-Fi interface is turned off, the internet connection checking unit 218 may proceed to operation 320 and attempt to access a cellular network. When the Wi-Fi interface is turned on, the internet connection checking unit 218 may proceed to operation 302 and determines whether an available AP is to be scanned. The scan operation as described above represents an operation of detecting an AP that may be accessed at a current location.

When not scanning the available AP, the internet connection checking unit 218 may proceed to operation 320 and attempt to access the cellular network. When scanning the available AP, the internet connection checking unit 218 may proceed to operation 304 and scans the available AP to provide the scan result to a user. For example, the internet connection checking unit 218 may display a list of accessible APs as the scan result on the user interface unit 214. Then, in operation 306, one of the displayed accessible APs may be selected by the user.

The internet connection checking unit 218 may check internet connectivity for the selected AP. Namely, the internet connection checking unit 218 determines in operation 310 whether the internet connection may be made by the selected AP. When the internet connection may be made by the selected AP, the internet connection checking unit 218 may proceed to operation 312 and accesses the selected AP.

When the internet connection cannot be made by the selected AP, the internet connection checking unit 218 may proceed to operation 314 and determines based on the scan result whether there is another available AP. When it is determined in operation 316 that there is another AP, the internet connection checking unit 218 may attempt to access the other AP in operation 318. When it is determined in operation 316 that the other AP does not exist, the internet connection checking unit 218 may proceed to operation 320 and attempt to access the cellular network.

Meanwhile, processes after operation 306 of FIG. 3 will be specifically described with reference to FIG. 4.

Figure 4:
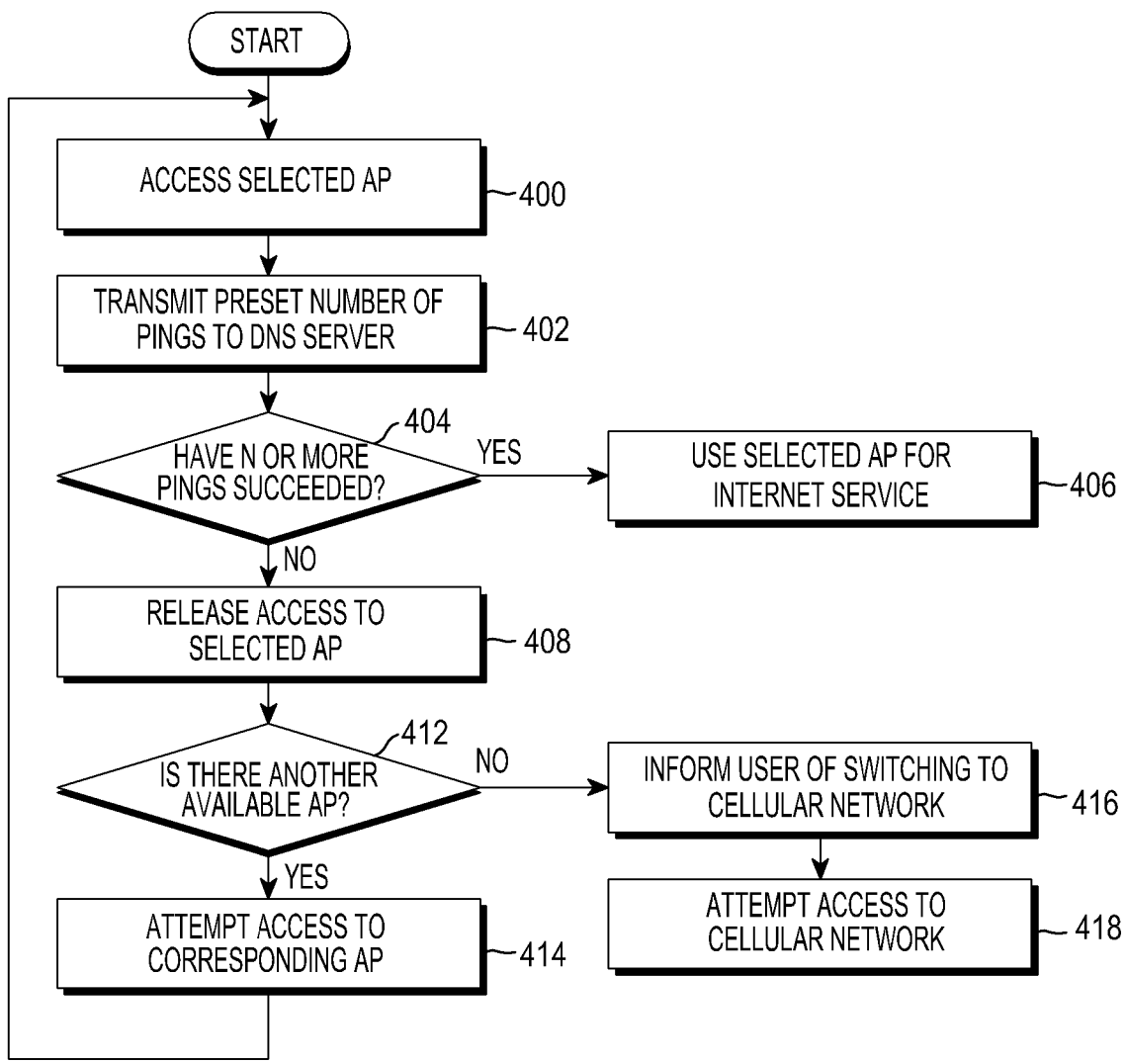
FIG. 4 is a flowchart illustrating a process of checking an internet connection status in an initial stage of Access Point (AP) access according to an embodiment of the present disclosure.

FIG. 4 is a flowchart illustrating a process of checking an internet connection status in an initial stage of AP access according to an embodiment of the present disclosure.

The process illustrated in FIG. 4 includes an internet connectivity identification process and a network switching process that are performed in the initial status of the AP access, and a specific description thereof will be given as follows.

Referring to FIG. 4, when the AP is selected by a user in operation 306 illustrated in FIG. 3, the internet connection checking unit 218 may access the selected AP in operation 400. Next, the internet connection checking unit 218 may transmit a preset number of pings to a DNS server, in operation 402. The internet connection checking unit 218 may determine in operation 404 whether N or more pings have succeeded. When N or more responses are received for the preset number of pings, the internet connection checking unit 218 may determine that the N or more pings have succeeded. Here, N denotes an integer greater than or equal to 1 and may be diversely changed and used as a reference for determining whether the ping has succeeded.

When the N or more pings have succeeded, the internet connection checking unit 218 may proceed to operation 406 and utilizes the selected AP for the internet service. When the N or more pings have not succeeded, namely, that all the pings have failed, the internet connection checking unit 218 may proceed to operation 408 and releases the connection to the selected AP.

Thereafter, the internet connection checking unit 218 may determine in operation 412 whether there is another available AP. When there is the other available AP, the internet connection checking unit 218 may proceed to operation 414 and attempts a connection to the corresponding AP. At this time, the internet connection checking unit 218 may also perform the operations subsequent to operation 400 for the corresponding AP, thereby maintaining the internet connection.

On the other hand, when the other available AP does not exist, the internet connection checking unit 218 may inform the user of switching to the cellular network, in operation 416. The method of informing the user of switching to the cellular network may be implemented in various forms such as a method of displaying the switching on a screen or informing of the switching through a sound, or a method of receiving confirmation from a user about whether to switch to the cellular network. Next, the internet connection checking unit 218 may attempt to access the cellular network in operation 418.

Hereinafter, a process of identifying an internet connection status and switching a network while a mobile station accesses an AP will be described with reference to FIG. 5.

Figure 5:
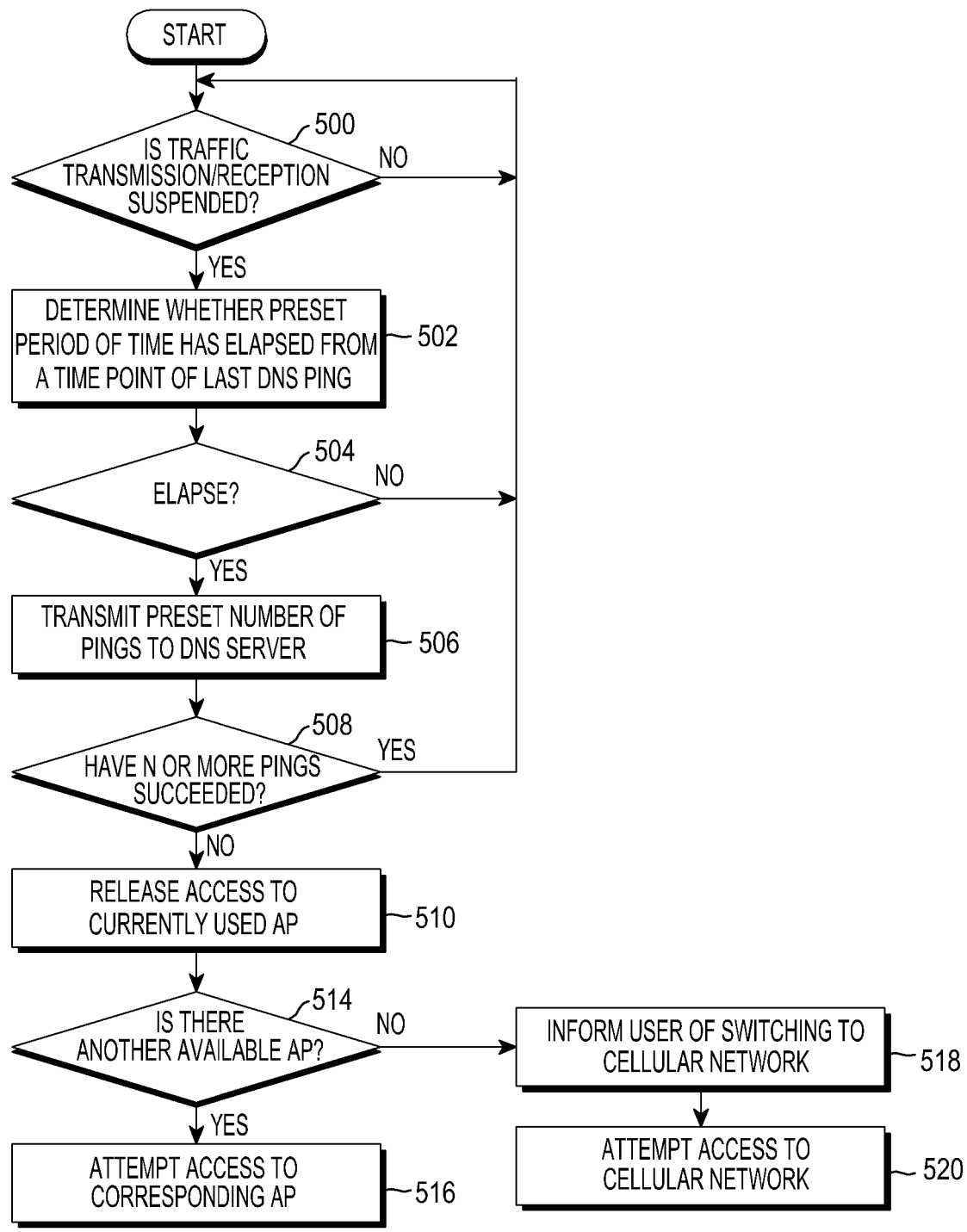
FIG. 5 is a flowchart illustrating a process of checking an internet connection status while access to an AP is made according to an embodiment of the present disclosure.

FIG. 5 is a flowchart illustrating a process of checking an internet connection status while access to an AP is made according to an embodiment of the present disclosure.

The process illustrated in FIG. 5 includes an internet connectivity identification process and a network switching process that are performed while a mobile station is being provided with an internet service by using an AP, and a specific description thereof will be given as follows.

Referring to FIG. 5, the internet connection checking unit 218 may determine in operation 500 whether traffic transmission and/or reception is suspended without being completed, by detecting traffic of application and network layers. When the traffic transmission and/or reception is suspended, the internet connection checking unit 218 may proceed to operation 502 and determines whether a preset period of time $N_{LAST}$ has elapsed from a time point of the last DNS ping. When the preset period of time has elapsed from the time point of the last DNS ping in operation 504, the internet connection checking unit 218 may identify internet connectivity by transmitting a preset number M of pings to a DNS server, in operation 506.

The internet connection checking unit 218 may determine in operation 508 whether N or more pings among the M pings have succeeded, and continuously uses a currently accessed AP when the N or more pings have succeeded (M≥N). On the other hand, when the N or more pings have not succeeded and particularly, all of the M pings have failed, the internet connection checking unit 218 may proceeds to operation 510 and release access to the currently used AP.

The internet connection checking unit 218 may determine whether there is another available AP. When it is determined in operation 514 that there is the other available AP, the internet connection checking unit 218 may proceed to operation 516 and attempt to access the corresponding AP. Namely, the internet connection checking unit 218 identifies internet connectivity for the corresponding AP and uses the corresponding AP as an AP for receiving an internet service based on the identified result.

Meanwhile, when another available AP does not exist, the internet connection checking unit 218 may determine that Wi-Fi communication cannot be used and determines switching to the cellular network. The internet connection checking unit 218 may inform a user of switching to the cellular network in operation 518, and attempt to access the cellular network in operation 520.

The process of determining the internet connection status by determining whether the traffic transmission and/or reception are suspended has been described with reference to FIG. 5. Unlike the aforementioned method, a process may be used for determining the internet connection status based on a traffic pattern. The process for determining the internet connection status based on the traffic pattern may be used when an accurate determination cannot be made as to whether the traffic transmission and/or reception are suspended. An example of the traffic pattern is illustrated in FIG. 6.

Figure 6:
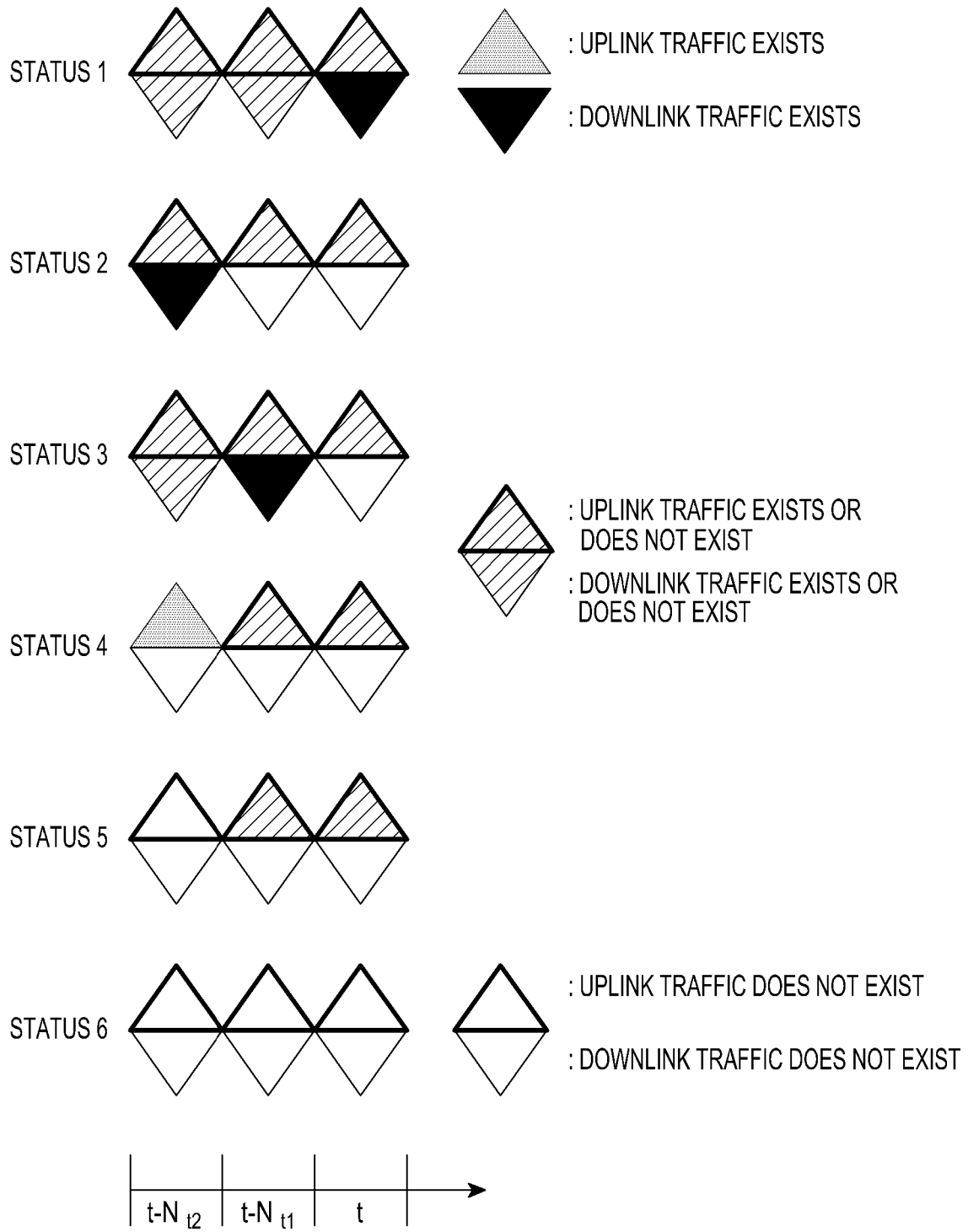
FIG. 6 illustrates traffic patterns according to an embodiment of the present disclosure.

FIG. 6 illustrates traffic patterns according to an embodiment of the present disclosure.

Referring to FIG. 6, traffic patterns represent traffic transmission and/or reception statuses, respectively, and may be classified into six statuses according to a presence or absence of uplink and downlink traffic for respective time intervals.

Status 1 represents a traffic pattern in which uplink traffic exists or does not exist for time intervals t, $t-N_{t1}$, and $t-N_{t2}$ (t=a specific time point, $N_{t1} < N_{t2}$), downlink traffic exists for the time interval t, and downlink traffic exists or does not exist for the time intervals $t-N_{t1}$ and $t-N_{t2}$.

Status 2 represents a traffic pattern in which uplink traffic exists or does not exist for time intervals t, $t-N_{t1}$, and $t-N_{t2}$, downlink traffic does not exist for the time intervals t and $t-N_{t1}$, and downlink traffic exists for the time interval $t-N_{t2}$.

Status 3 represents a traffic pattern in which uplink traffic exists or does not exist for time intervals t, $t-N_{t1}$, and $t-N_{t2}$, downlink traffic does not exist for the time interval t, downlink traffic exists for the time interval $t-N_{t1}$, and downlink traffic exists or does not exist for the time interval $t-N_{t2}$.

Status 4 represents a traffic pattern in which uplink traffic exists or does not exist for time intervals t, and $t-N_{t1}$, uplink traffic exists for a time interval $t-N_{t2}$, downlink traffic does not exist for the time intervals t, $t-N_{t1}$, and $t-N_{t2}$.

Status 5 represents a traffic pattern, in which uplink traffic exists or does not exist for time intervals t, and $t-N_{t1}$, uplink traffic does not exist for a time interval $t-N_{t2}$, and downlink traffic does not exist for the time intervals t, $t-N_{t1}$, and $t-N_{t2}$.

Status 6 represents a traffic pattern in which both uplink traffic and downlink traffic do not exist for time intervals t, $t-N_{t1}$, and $t-N_{t2}$.

An internet connection status may be determined according to the aforementioned six traffic patterns, and an internet connection status that may be predicted according to the six traffic patterns may be represented as illustrated in Table 1.

TABLE 1

| Status | Traffic Pattern | Predicted Internet Connection Status |
| --- | --- | --- |
| 1 | Reception packet exists at current time point. | Connection |
| 2 | No reception packet exists at current time point and for previous time interval $N_{t1}$. Reception packet exists for previous time interval $N_{t2}$. | Connection in doubt |
| 3 | No reception packet exists at current time point. Reception packet exists for previous time interval $N_{t1}$. | Determine connection status at next time point |
| 4 | No reception packet exists at current time point and for previous time interval $N_{t2}$. Transmission packet exists for previous time interval $N_{t2}$. | Connection in doubt |
| 5 | No reception packet exists at current time point and for previous time interval $N_{t2}$. Transmission packet exists at current time point and for previous time interval $N_{t1}$. | Determine connection status at next time point |
| 6 | No transmission packet exists at current time point and for previous time interval $N_{t1}$. | Internet connection status determination is unnecessary. |

As illustrated in Table 1, shaded sections of FIG. 6 for representing that the uplink and/or downlink traffic exists or does not exist may not be considered when an internet connection status is determined in a mobile station.

Although all of the aforementioned six traffic patterns may be used to determine the internet connection status, the six traffic patterns may be diversely used in such a way that some of the six traffic patterns (e.g., traffic patterns corresponding to the statuses 2 and 4) may be used.

Figure 7:
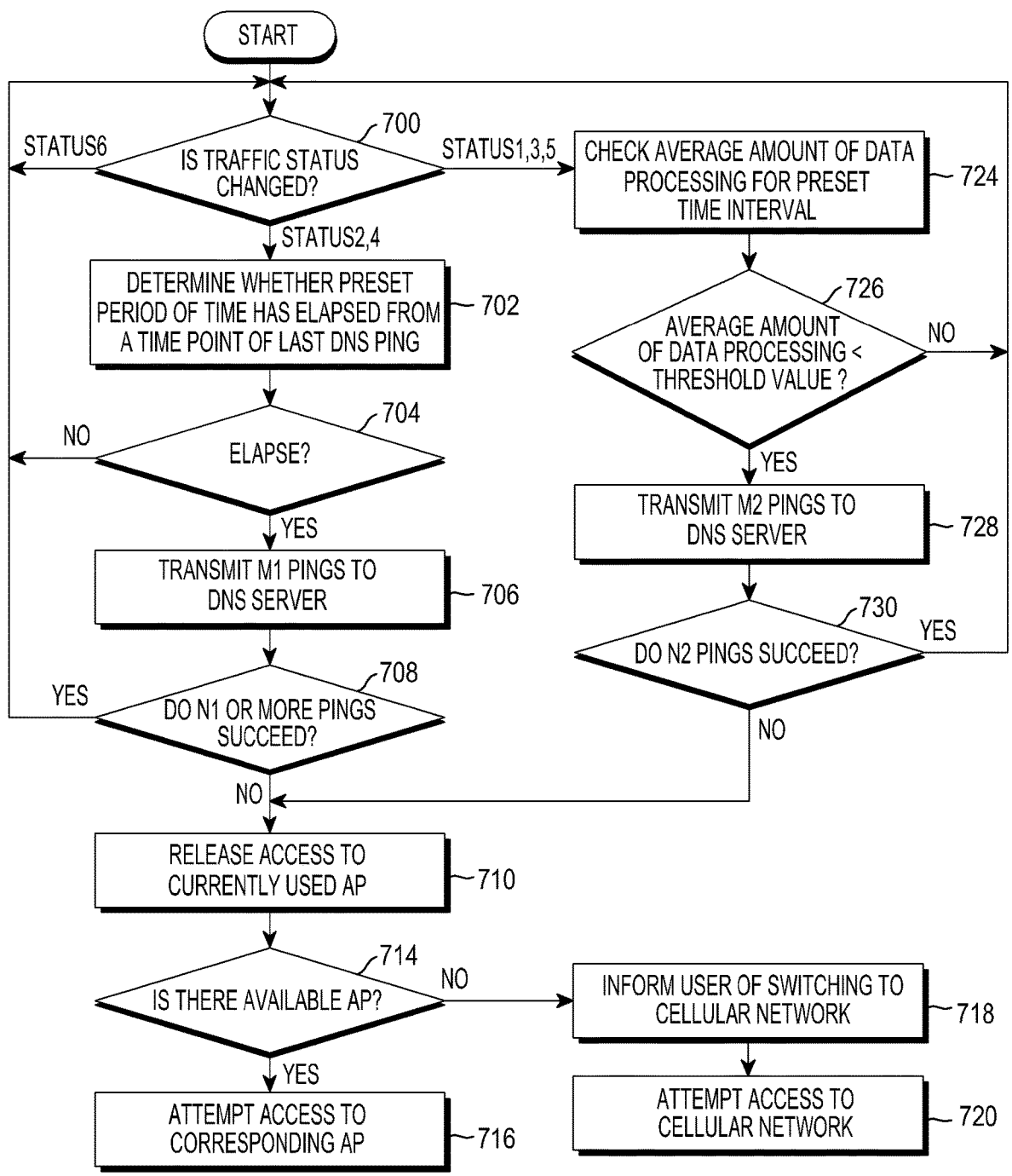
FIG. 7 is a flowchart illustrating a process of checking an internet connection status while an internet service is being used according to an embodiment of the present disclosure.

Meanwhile, a process of identifying internet connectivity and switching a network based on contents of Table 1 is illustrated in FIG. 7.

FIG. 7 is a flowchart illustrating a process of checking an internet connection status while an internet service is being used according to an embodiment of the present disclosure.

Referring to FIG. 7, the internet connection checking unit 218 may check a traffic status at every specific time interval while an internet service is being used through an AP. In operation 700, the internet connection checking unit 218 may determine, according to the checking result, whether the traffic status has been changed.

The internet connection checking unit 218 may proceed to operation 724 when the changed traffic status corresponds to one of the statuses 1, 3, and 5, and may return to operation 700 when the changed traffic status corresponds to the status 6. When the changed traffic status corresponds to the status 2 or 4, the internet connection checking unit 218 may proceed to operation 702 and determine whether a preset period of time NLAST has elapsed from a time point of the last DNS ping.

When it is determined in operation 704 that the preset period of time has elapsed, the internet connection checking unit 218 may transmit M1 pings to a DNS server in operation 706. Otherwise, in operation 704, when it is determined that the preset period of time has not elapsed, the internet connection checking unit 218 may return to operation 700. The internet connection checking unit 218 may determine in operation 708 whether N1 or more pings among the M1 pings have succeeded (M1≥N1). The internet connection checking unit 218 may return to operation 700 and checks the traffic status when the N1 or more pings have succeeded, and release access to the currently used AP in operation 710 when the N1 or more pings have not succeeded.

The internet connection checking unit 218 may determine in operation 714 whether there is another available AP. When there is another available AP, the internet connection checking unit 218 may proceed to operation 716 and attempt to access the corresponding AP. When the other available AP does not exist, the internet connection checking unit 218 may inform a user of switching to the cellular network in operation 718, and proceed to operation 720 to attempt to access the cellular network.

The internet connection checking unit 218 may check an average amount of data processing for a preset time interval in operation 724, when it is determined in operation 700 that the changed traffic status corresponds to one of the statuses 1, 3, and 5. The internet connection checking unit 218 may determine in operation 726 whether the average amount of data processing is less than a threshold value, and transmit M2 pings to the DNS server in operation 728 when the average amount of data processing is less than the threshold value. Otherwise, in operation 726 when it is determined that the average amount of data processing is greater or equal to a threshold value, the internet connection checking unit 218 may return to operation 700. Thereafter, the internet connection checking unit 218 may determine in operation 730 whether N2 or more pings among the M2 pings have succeeded (M2≥N2, N2>N1). The internet connection checking unit 218 may return to operation 700 when the N2 pings have succeeded, and perform the aforementioned operations subsequent to operation 710 when the N2 pings have not succeeded. The Wi-Fi network uses a frequency band that is not allocated to a specific telecommunication service provider and is open to be used by all entities satisfying predefined requirements, and thus a usage fee is not required for the Wi-Fi network. However, the cellular network uses a frequency band allocated only to authorized telecommunication service providers and thus, a usage fee is required for the cellular network.

Accordingly, when the Wi-Fi network is switched to the cellular network, a problem of charging according to usage of the cellular network arises. Therefore, in an embodiment of the present disclosure, a user interface is provided through which a user may selectively use the cellular network in consideration of the problem of charging. Examples of the user interface are illustrated in FIGS. 8 to 10.

Figure 8C:
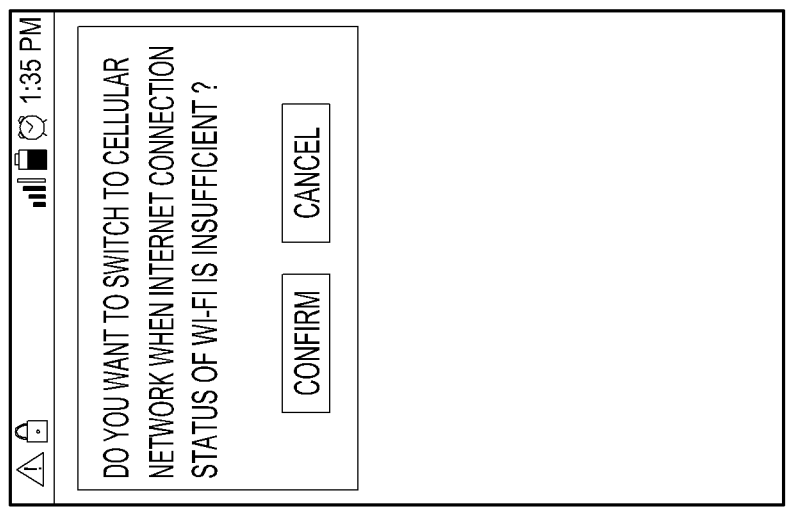
FIGS. 8A, 8B, and 8C illustrate user interfaces through which a cellular network may be selectively used according to an embodiment of the present disclosure.
Figure 8B:
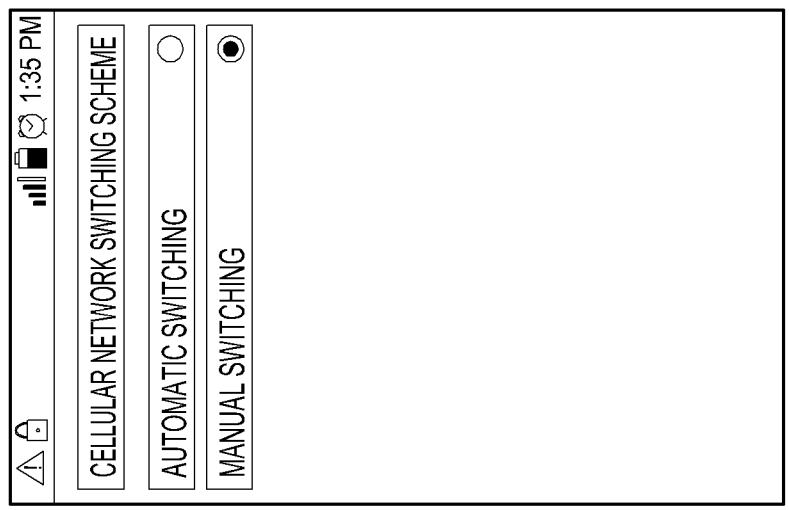
Figure 8A:
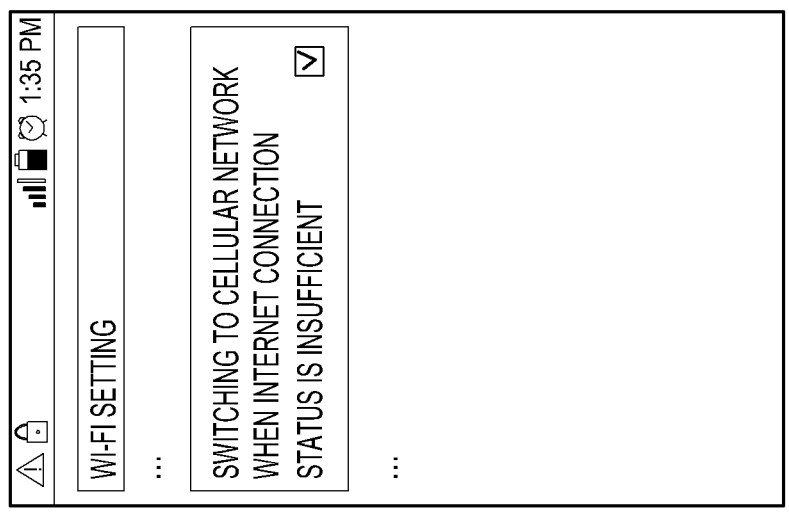

FIGS. 8A, 8B, and 8C illustrate user interfaces through which a cellular network may be selectively used according to an embodiment of the present disclosure.

Referring to FIG. 8A, a menu enabling a user to select a function for switching to the cellular network in a case in which an internet connection status through the Wi-Fi network is insufficient and another AP does not exist is illustrated. When the user does not select the menu, the switching to the cellular network is not performed even if the internet connection status is insufficient. On the other hand, when the user selects the menu, a menu may be presented to the user as illustrated in FIG. 8B.

Referring to FIG. 8B, an automatic switching menu and a manual switching menu, which enable the user to select a switching scheme to the cellular network is illustrated. When the automatic switching menu is selected, the switching to the cellular network is automatically performed without a selection of the user. When the manual switching menu is selected, the switching to the cellular network is selected according to a selection of the user.

In a state where the manual switching menu is selected, when an internet connection status is insufficient so that the Wi-Fi network should be switched to the cellular network, a notification window may be displayed as illustrated in FIG. 8C. Referring to FIG. 8C, the notification window informs the user that an internet connection status through the Wi-Fi network is insufficient, and enables the user to select the switching to the cellular network. The user may determine the switching to the cellular network by selecting one of 'Confirm' and 'Cancel' buttons displayed in FIG. 8C.

FIGS. 9A and 9B illustrate user interfaces through which switching to a cellular network may be selectively used for each of application programs according to an embodiment of the present disclosure.

Referring to FIG. 9A, a user selects a function for switching to the cellular network in a menu when an internet connection status through the Wi-Fi network is insufficient and another AP does not exist, a menu illustrated in FIG. 9B may be provided to the user.

Referring to FIG. 9B, when an automatic switching menu through which the switching to the cellular network is automatically performed without the user's selection is first selected, a menu may be additionally provided through which the switching to the cellular network may be selectively used for each of application programs.

If the user selects specific application programs (e.g., APP 1 and APP 3), switching to the cellular network may be automatically performed while the selected application programs are being used. Further, in a case of the remaining application programs (APP 2 and APP N) not selected by the user, switching to the cellular network may be performed according to the user's selection through the notification window as illustrated in FIG. 8C.

Although the user interface has been presented in FIGS. 9A and 9B for selecting application programs for which the switching to the cellular network may be automatically performed, a user interface may be presented for selecting application programs for which switching to the cellular network may not be automatically performed. A description thereof will be given with reference to FIGS. 10A and 10B.

FIGS. 10A and 10B illustrate other user interfaces through which switching to a cellular network may be selectively used for each of application programs according to an embodiment of the present disclosure.

Referring to FIGS. 10A and 10B, in contrast to FIGS. 9A and 9B, a menu is provided for selecting at least one application program for which a user does not want the switching to the cellular network.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a mobile station in a wireless communication system, the method comprising:
   identifying that a wireless communication through a first access point (AP) connected to the mobile station is suspended, wherein the first AP supports Wi-Fi communication;
   in response to identifying that the wireless communication through the first AP is suspended, determining whether a preset time has elapsed from a time point when at least one ping was most recently transmitted through the first AP to a domain name system (DNS) server;
   transmitting first M pings to the DNS server through the first AP when the preset time has elapsed, M being a preset positive integer;
   determining whether first N or more responses corresponding to the first M pings are received from the DNS server, N being a positive integer less than or equal to M; and
   in response to failure of receipt of the first N or more responses:
     releasing a connection to the first AP,
     performing a scan operation for detecting at least one connectable AP,
     selecting a second AP from the at least one connectable AP and connecting to the second AP if the at least one connectable AP is detected, and
     connecting to a cellular network if the at least one connectable AP is not detected.

2. The method of claim 1, further comprising:
   maintaining the connection to the first AP in response to successful receipt of the first N or more responses.

3. The method of claim 1, further comprising:
   displaying information of the at least one connectable AP based on detection of the at least one connectable AP.

4. The method of claim 1, further comprising:
   transmitting second M pings to the DNS server through the second AP;
   determining whether second N or more responses corresponding to the second M pings are received through the second AP from the DNS server; and
   connecting to the second AP in response to successful receipt of the second N or more responses through the second AP.

5. The method of claim 1, further comprising:
   displaying a user interface for selecting one of the second AP or the cellular network, in response to the failure of the receipt of the first N or more responses; and
   connecting to the one of the second AP or the cellular network based on a selection input to the user interface.

6. The method of claim 1, further comprising, in response to the failure of receipt of the first N or more responses:
   connecting to the second AP if an interface for a Wi-Fi communication is turned on; and
   connecting to the cellular network if the interface for the Wi-Fi communication is turned off.

7. A mobile station in a wireless communication system, the mobile station comprising:
   a transceiver; and
   at least one processor configured to:
     identify that a wireless communication through a first access point (AP) connected to the mobile station is suspended, wherein the first AP supports Wi-FI communication;

in response to identifying that the wireless communication through the first AP is suspended, determine whether a preset time has elapsed from a time point when at least one ping was most recently transmitted through the first AP to a domain name system (DNS) server;

control the transceiver to transmit first M pings to the DNS server through the first AP when the preset time has elapsed, M being a preset positive integer;

determine whether first N or more responses corresponding to the first M pings are received from the DNS server, N being a positive integer less than or equal to M; and in response to failure of receipt of the first N or more responses:
release a connection to the first AP,
perform a scan operation for detecting at least one connectable AP,
select a second AP from the at least one connectable AP and connect to the second AP if the at least one connectable AP is detected, and
connect to a cellular network if the at least one connectable AP is not detected.

8. The mobile station of claim 7, wherein the at least one processor is further configured to:
maintain the connection to the first AP in response to successful receipt of the first N or more responses.

9. The mobile station of claim 7, further comprising a display,
wherein the at least one processor is further configured to:
display information of the at least one connectable AP on the display based on detection of the at least one connectable AP.

10. The mobile station of claim 7, wherein the at least one processor is further configured to:
control the transceiver to transmit second M pings to the DNS server through the second AP,
determine whether second N or more responses corresponding to the second M pings are received through the second AP from the DNS server, and
connect to the second AP in response to successful receipt of the second N or more responses through the second AP.

11. The mobile station of claim 7,
further comprising a display,
wherein the at least one processor is further configured to:
display a user interface for selecting, via the display, one of the second AP or the cellular network, in response to the failure of the receipt of the first N or more responses, and
connect to the one of the second AP or the cellular network based on a selection input to the user interface.

12. The mobile station of claim 7, wherein the at least one processor is further configured to:
connect to the second AP if an interface for a Wi-Fi communication is turned on, and
connect to the cellular network if the interface for the Wi-Fi communication is turned off.

13. A computer program product, comprising a non-transitory computer readable storage medium having program code stored thereon, the program code being executable by computer hardware to perform operations including:
identifying that a wireless communication through a first access point (AP) connected to a mobile station is suspended, wherein the first AP supports Wi-Fi communication;
in response to identifying that the wireless communication through the first AP is suspended, determining whether a preset time has elapsed from a time point when at least one ping was most recently transmitted through the first AP to a domain name system (DNS) server;
transmitting M pings to the DNS server through the first AP when the preset time has elapsed, M being a preset positive integer;
determining whether first N or more responses corresponding to the M pings are received from the DNS server, N being a positive integer less than or equal to M; and
in response to failure of receipt of the first N or more responses:
releasing a connection to the first AP,
performing a scan operation for detecting at least one connectable AP,
selecting a second AP from the at least one connectable AP and connecting to the second AP if the at least one connectable AP is detected, and
connecting to a cellular network if the at least one connectable AP is not detected.

14. The computer program product of claim 13, wherein the operations further comprise:
maintaining the connection to the first AP in response to successful receipt of the N or more responses.

15. The computer program product of claim 13, wherein the operations further comprise:
displaying information of the at least one connectable AP based on detection of the at least one connectable AP.

16. The computer program product of claim 13, wherein the operations further comprise:
displaying a user interface for selecting one of the second AP or the cellular network, in response to the failure of the receipt of the N or more responses; and
connecting to the one of the second AP or the cellular network based on a selection input to the user interface.

17. The computer program product of claim 13, wherein the operations further comprise:
connecting to the second AP if an interface for a Wi-Fi communication is turned on; and
connecting to the cellular network if the interface for the Wi-Fi communication is turned off.

* * * * *